United States Patent
Kuno

(10) Patent No.: US 7,885,479 B2
(45) Date of Patent: Feb. 8, 2011

(54) IMAGE PROCESSING DEVICE THAT QUICKLY DISPLAYS RETINEX-PROCESSED PREVIEW IMAGE

(75) Inventor: Masashi Kuno, Aichi-ken (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 832 days.

(21) Appl. No.: 11/846,931

(22) Filed: Aug. 29, 2007

(65) Prior Publication Data

US 2008/0056615 A1 Mar. 6, 2008

(30) Foreign Application Priority Data

Aug. 30, 2006 (JP) .............................. 2006-233138

(51) Int. Cl.
*G06K 9/40* (2006.01)

(52) U.S. Cl. ...................... 382/276; 382/260; 382/274; 382/275

(58) Field of Classification Search ................ 382/260, 382/274, 275

See application file for complete search history.

(56) References Cited

U.S. PATENT DOCUMENTS

| 6,885,482 | B1 | 4/2005 | Kubo et al. | |
| 6,947,176 | B1 | 9/2005 | Kubo et al. | |
| 7,271,380 | B2 * | 9/2007 | Banton et al. | 250/226 |
| 7,275,014 | B1 * | 9/2007 | Koren et al. | 702/150 |
| 7,308,139 | B2 * | 12/2007 | Wentland et al. | 382/181 |
| 7,321,112 | B2 * | 1/2008 | Stam et al. | 250/216 |
| 7,358,502 | B1 * | 4/2008 | Appleby et al. | 250/370.14 |
| 2004/0091164 | A1 | 5/2004 | Sakatani | |
| 2005/0110882 | A1 | 5/2005 | Fukuda | |

FOREIGN PATENT DOCUMENTS

| JP | 2001-69525 | 3/2001 |
| JP | 2001-78025 | 3/2001 |
| JP | 2004-165840 | 6/2004 |
| JP | 2005-52994 | 3/2005 |
| JP | 2005-57598 | 3/2005 |
| JP | 2005-176304 | 6/2005 |
| JP | 3731577 | 10/2005 |

* cited by examiner

*Primary Examiner*—Yosef Kassa
(74) *Attorney, Agent, or Firm*—Scully, Scott, Murphy & Presser, PC

(57) ABSTRACT

A reduced-image creating portion creates a reduced image from an original image. A reduced-retinex-image forming portion calculates reflectance of each pixel in the reduced image, thereby forming a reduced retinex image. A normalizing-parameter setting portion obtains frequencies of the reflectance in the reduced retinex image and sets upper and lower limits for normalization. A first normalizing portion obtains a normalized reflectance for each pixel in the reduced image. A first correcting portion obtains a corrected reduced image. A preview-image displaying portion displays the corrected reduced image on a display unit. A retinex-image forming portion calculates reflectance of each pixel in the original image. A second normalizing portion normalizes the reflectance of the original image based on the upper limit and the lower limit, thereby obtaining a normalized reflectance for each pixel in the original image. A second correcting portion corrects the original image, thereby obtaining a corrected original image.

17 Claims, 5 Drawing Sheets

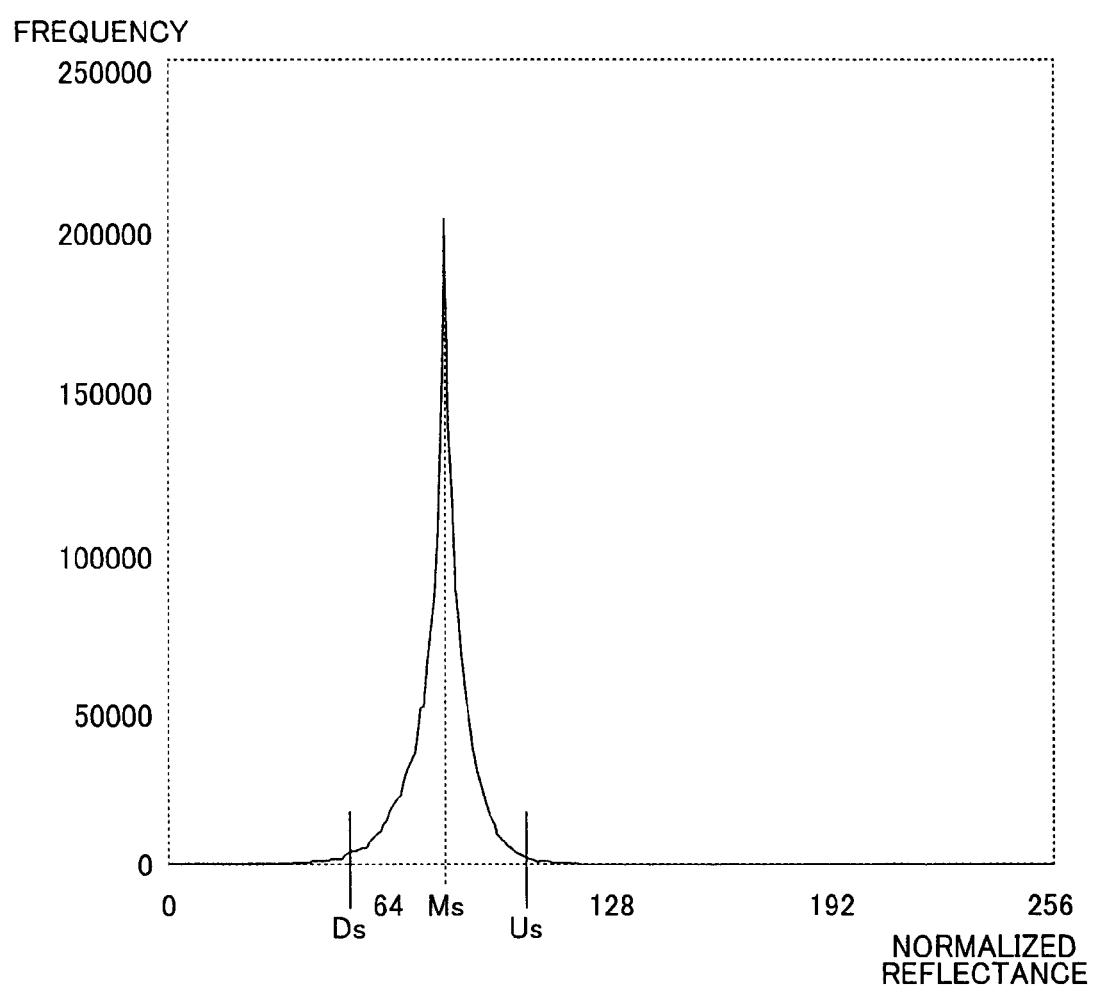

IMAGE PROCESSING DEVICE THAT QUICKLY DISPLAYS RETINEX-PROCESSED PREVIEW IMAGE

CROSS REFERENCE TO RELATED APPLICATIONS

This application claims priority from Japanese Patent Application No. 2006-233138 filed Aug. 30, 2006. The entire content of the priority application is incorporated herein by reference.

TECHNICAL FIELD

The invention relates to an image processing device, an image processing method, and a storage medium storing an image processing program, and more specifically to an image processing device, an image processing method, and a storage medium storing an image processing program that performs a Retinex process on an image.

BACKGROUND

When taking a photograph of a subject under backlit conditions, e.g. against the sun, the image of the subject portion is an indistinct backlit image with low lightness and contrast, making it difficult to make out details of the subject. Image processing is performed to improve the quality of these backlit images, as well as images suffering in quality due to overexposure, underexposure, blurring due to jiggling when capturing the image, noise, insufficient light, and the like, in order to improve lightness and contrast in the image. One method used in conventional image processing is a Retinex process.

The Retinex process preserves the input image data for high-quality regions and improves the image quality primarily in low-quality regions. The Retinex process uses Gaussian filters for correcting pixel data in the original image to values reflecting data of surrounding pixels, calculates reference component data for the original image from the natural logarithm of the calibrated pixel data, and calculates luminance component data by dividing pixel data of the original image by pixel components of the original image. Specifically, this process divides the original image into reference components and luminance components. Next, a process is performed to calibrate the brightness and level (contrast) of the luminance component through gamma correction or the like and subsequently generates improved image data for the original image in backlit portions and the like by combining the calibrated luminance components with the reference components. The reference component is found by normalizing a reflectance R(x, y).

U.S. Pat. No. 6,885,482 (corresponding to Japanese Patent Application Publication No. 2001-69525) discloses a method of converting RGB values to a color space configured of a luminance component and chromatic components, such as YCbCr or YIQ, performing the Retinex process only on the luminance component Y, while maintaining the chromatic components, and converting the values back to RGB. Calibrating only the luminance component (i.e. not calibrating the chromatic components) prevents an upset in the color balance and a shift in color. Further, since the Retinex process is performed only on the luminance component, this method requires fewer calculations than a method for performing the Retinex process on each RGB plane and, hence, can complete the process quicker. Further, less storage space is required for normalizing reflectance R(x, y) values since only the luminance value is stored, rather than each RGB value.

U.S. Patent Application Publication No. 2004/0091164 (corresponding to Japanese Patent No. 3,731,577) discloses a method for improving the processing speed in the Retinex process. This method forms a reduced image (low-resolution image) from the original image using an average pixel method or the like, forms a peripheral average luminance image (blurred image) by finding a peripheral (surround) average luminance for each pixel in the reduced image, forms a Retinex processed image from the original image and an image produced by expanding the blurred image, and forms an output image from the original image and the Retinex processed image.

Japanese Patent Application Publication No. 2005-57598 discloses a device capable of displaying a preview image and a thumbnail image for reducing a storage space of these image data.

SUMMARY

However, the Retinex processes disclosed in U.S. Patent Application Publication No. 2004/0091164 and U.S. Pat. No. 6,885,482 have a problem that a large size of memory is required for storing reflectance values and a problem that it takes a long time to output processed images. Further, the device disclosed in Japanese Patent Application Publication No. 2005-57598 has a problem that a larger size of memory is required for storing preview images and thumbnail images as data size of these images becomes larger. The device also has a problem that it takes a longer time to display preview images and thumbnail images as data size of these images becomes larger, since the device displays the images after image processing has been completed.

In view of the foregoing, it is an object of the invention to provide an image processing device, an image processing method, and a storage medium storing an image processing program that is capable of performing the Retinex process at a high speed.

In order to attain the above and other objects, the invention provides an image processing device. The image processing device includes a display unit, a reduced image creating portion, a reduced-retinex-image forming portion, a normalizing-parameter setting portion, a reduced-image correcting portion, a preview-image displaying portion, and an original-image correcting portion. The display unit displays an image. The reduced-image creating portion creates a reduced image from an original image. The reduced-retinex-image forming portion calculates reflectance of each pixel in the reduced image based both on a pixel value of a subject pixel in the reduced image and on a peripheral average luminance of the subject pixel, thereby forming a reduced retinex image that is configured of reflectance of each pixel in the reduced image. The normalizing-parameter setting portion obtains frequencies of the reflectance in the reduced retinex image and sets an upper limit and a lower limit for normalization. The reduced-image correcting portion includes a first normalizing portion and a first correcting portion. The first normalizing portion normalizes the reflectance of the reduced image based on the upper limit and the lower limit, thereby obtaining a normalized reflectance for each pixel in the reduced image. The first correcting portion corrects the reduced image based both on the normalized reflectance and on the pixel value for each pixel in the reduced image, thereby obtaining a corrected reduced image. The preview-image displaying portion displays the corrected reduced image on the display unit. The original-image correcting portion includes a retinex-image forming portion, a second normalizing portion, and a second correcting portion. The retinex-image forming portion calculates reflectance of each pixel in the original image based both on a pixel value of a subject pixel in the original image and on a peripheral average luminance of the subject pixel. The second normalizing portion normalizes the reflectance of the original image based on the upper limit and the lower limit, thereby obtaining a normalized reflectance for each pixel in the original image. The second correcting portion corrects the original image based both on the normalized reflectance and on the pixel value for each pixel in the original image, thereby obtaining a corrected original image.

According to another aspect, the invention also provides a storage medium storing a set of program instructions executable on an image processing device. The set of program instructions includes: creating a reduced image from an original image; calculating reflectance of each pixel in the reduced image based both on a pixel value of a subject pixel in the reduced image and on a peripheral average luminance of the subject pixel, thereby forming a reduced retinex image that is configured of reflectance of each pixel in the reduced image; obtaining frequencies of the reflectance in the reduced retinex image and setting an upper limit and a lower limit for normalization, normalizing the reflectance of the reduced image based on the upper limit and the lower limit, thereby obtaining a normalized reflectance for each pixel in the reduced image; correcting the reduced image based both on the normalized reflectance and on the pixel value for each pixel in the reduced image, thereby obtaining a corrected reduced image; displaying the corrected reduced image on a display unit; calculating reflectance of each pixel in the original image based both on a pixel value of a subject pixel in the original image and on a peripheral average luminance of the subject pixel; normalizing the reflectance of the original image based on the upper limit and the lower limit, thereby obtaining a normalized reflectance for each pixel in the original image; and correcting the original image based both on the normalized reflectance and on the pixel value for each pixel in the original image, thereby obtaining a corrected original image.

According to still another aspect, the invention also provides an image processing method. The image processing method includes: creating a reduced image from an original image; calculating reflectance of each pixel in the reduced image based both on a pixel value of a subject pixel in the reduced image and on a peripheral average luminance of the subject pixel, thereby forming a reduced retinex image that is configured of reflectance of each pixel in the reduced image; obtaining frequencies of the reflectance in the reduced retinex image and setting an upper limit and a lower limit for normalization; normalizing the reflectance of the reduced image based on the upper limit and the lower limit, thereby obtaining a normalized reflectance for each pixel in the reduced image; correcting the reduced image based both on the normalized reflectance and on the pixel value for each pixel in the reduced image, thereby obtaining a corrected reduced image; displaying the corrected reduced image on a display unit; calculating reflectance of each pixel in the original image based both on a pixel value of a subject pixel in the original image and on a peripheral average luminance of the subject pixel; normalizing the reflectance of the original image based on the upper limit and the lower limit, thereby obtaining a normalized reflectance for each pixel in the original image; and correcting the original image based both on the normalized reflectance and on the pixel value for each pixel in the original image, thereby obtaining a corrected original image.

BRIEF DESCRIPTION OF THE DRAWINGS

In the drawings:

FIG. 6 is a histogram illustrating a clipped range used for normalization of reflectance $R(x, y)$.

DETAILED DESCRIPTION

Figure 1:
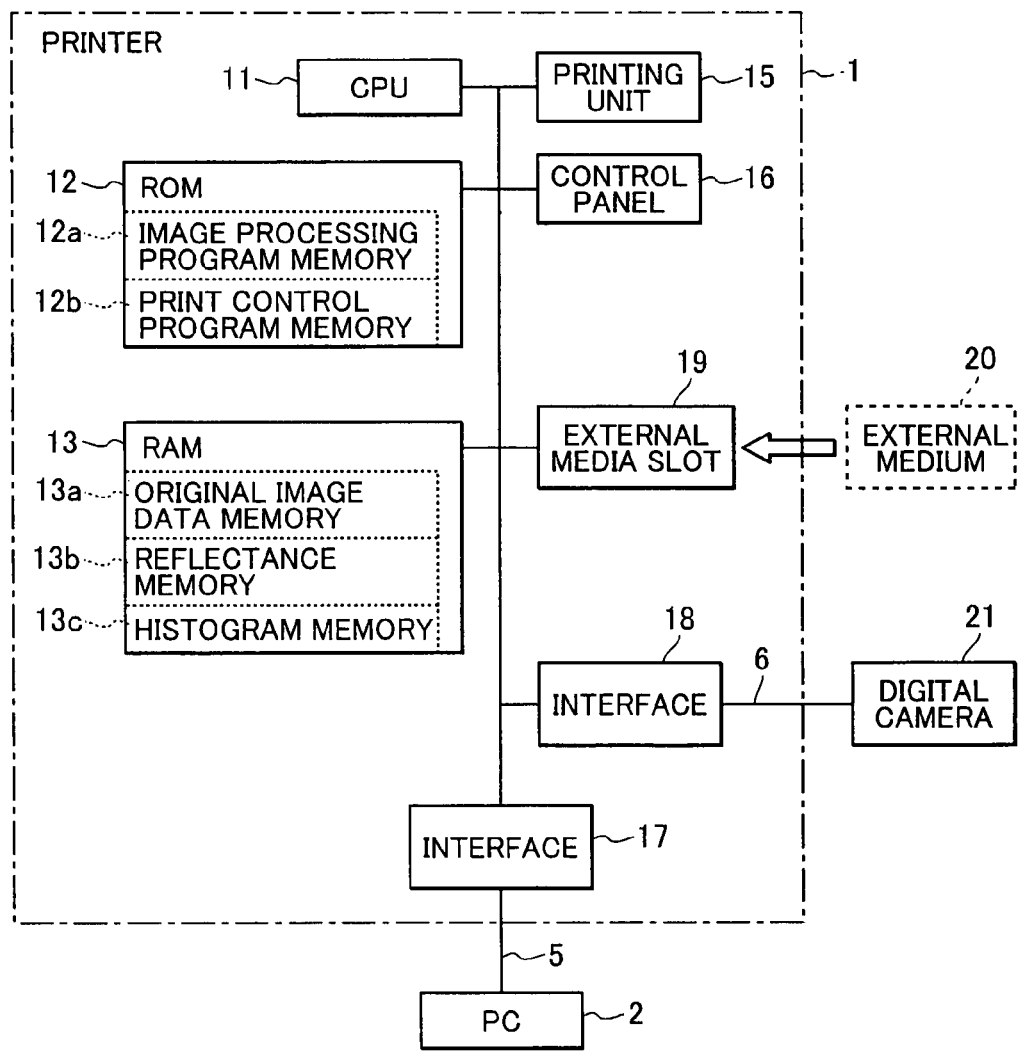
FIG. 1 is a block diagram showing the electrical structure of a printer having an image processing program according to an embodiment of the invention.

An image processing device, an image processing method, and a storage medium storing an image processing program according to an embodiment of the invention will be described with reference to FIGS. 1 through 6. FIG. 1 is a block diagram showing the electrical structure of a printer 1 having a function for performing an image process according to the embodiment. In the embodiment, the printer 1 is connected to a personal computer (hereinafter referred to as a "PC") 2, a digital camera 21, and/or an external medium 20. An image processing program installed on the printer 1 executes a Retinex process and a histogram process on image data (image data for an original document or the like) inputted from the PC 2, digital camera 21, or external medium 20. The image processing program corrects low-quality regions of the image data, such as backlit image regions.

As shown in FIG. 1, the printer 1 includes a CPU 11, a ROM 12, a RAM 13, a printing unit 15, and a control panel 16. The printing unit 15 has a print head and the like for printing out image data on a printing medium, such as paper. The control panel 16 has a user operating unit configured of a ten-key pad and the like, for example, enabling the user to input values for the size of the outputted image and the like.

The printer 1 also includes an interface 17, an interface 18, and an external media slot 19. The interface 17 is provided for connecting the printer 1 to the PC 2 with a cable 5. The interface 18 is provided for connecting the printer 1 to the digital camera 21 with a cable 6. The external media slot 19 allows the user to detachably mount the external medium 20 in the printer 1, the external medium 20 being an SD card or a Memory Stick, for example. The interfaces 17 and 18 use the Universal Serial Bus (USB) communication method.

Accordingly, image data stored on the PC 2 can be inputted into the printer 1 via the cable 5 and the interface 17, while image data captured by the digital camera 21 can be inputted into the printer 1 via the cable 6 and the interface 18. Further, image data stored on the external medium 20 can be inputted into the printer 1 when the external medium 20 is mounted in the external media slot 19.

The CPU 11 is an arithmetic processor that controls the overall operations of the printer 1. The ROM 12 stores various control programs executed by the CPU 11 and fixed values used when the CPU 11 executes programs. The ROM 12 includes an image processing program memory 12a, and a print control program memory 12b. The image processing program memory 12a stores the image processing program for performing such image processing as the Retinex process and the histogram process. The print control program memory 12b stores a print control program for executing a printing operation.

The RAM 13 is a rewritable random access memory that includes a work area for storing a set of registers required when the CPU 11 executes the control programs, and a temporary area for temporarily storing data during such processes. The RAM 13 also includes an original image data memory 13a, a reflectance memory 13b (reduced-retinex-image memory), and a histogram memory 13c. The original image data memory 13a stores original image data. The reflectance memory 13b stores reflectance values that are obtained by reducing an original image and performing the Retinex process of the reduced image. The histogram memory 13c stores frequencies of pixel values of each pixel in the histogram process.

The original image data memory 13a stores image data inputted from the PC 2, digital camera 21, and external medium 20 via the interface 17, interface 18, and external media slot 19, respectively. In the embodiment, the original image data and output image data are configured of RGB values, each of which is a value in the range 0-255.

Specifically, the RGB values include components representing the three primary colors of light, i.e. an R value representing red, a G value representing green, and a B value representing blue. Together, the R, G, and B values are collectively referred to as pixel values P. The combination of RGB values for each pixel of an input image indicates one color (hue, tone, etc.). The greater the RGB values, the higher the luminance (brightness).

The reflectance memory 13b is a memory area used in the Retinex process for storing reflectances $Rs(x, y)$ obtained from luminance values of the original image after the original image is compressed (reduced). The original image is compressed according to a method well known in the art, such as the nearest neighbor method for sampling a value of a pixel nearest a position of the original image corresponding to a pixel of the reduced image and for using the sampled pixel value, or the bi-cubic method or average pixel method for performing interpolation using pixels surrounding a position in the original image corresponding to a pixel of the reduced image. The nearest neighbor method is used when processing speed is given priority over image quality, and the bi-cubic method or average pixel method is used when giving priority to image quality over processing speed. Accordingly, an upper limit Us and a lower limit Ds of a clipped range (normalizing parameters) described later can be relatively accurately set when using the bi-cubic method or the average pixel method.

The original image is compressed according to one of these methods, and the reflectance for each pixel in the reduced image is calculated using equation 3 described later. The calculated reflectance values are stored in the reflectance memory 13b.

Figure 2:
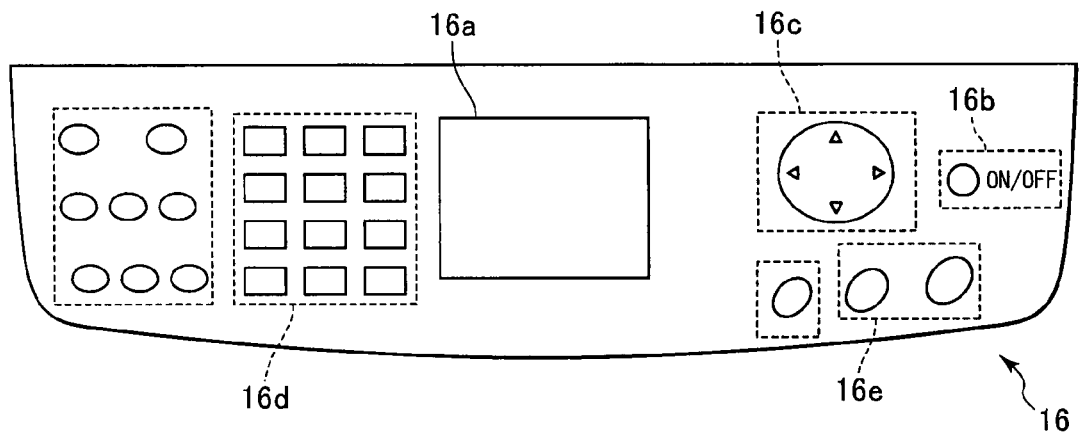
FIG. 2 is a view showing a control panel of the printer according to the embodiment.

Next, a control panel 16 of the printer 1 will be described with reference to FIG. 2. As shown in FIG. 2, the control panel 16 is configured of LCD 16a and various input keys 16b-16e.

The LCD 16a is a liquid crystal display for displaying various information of the printer 1. The LCD 16a displays a preview image obtained by reducing an original image, or obtained by correcting an original image by the Retinex process or the like. The LCD 16a also displays a screen indicating whether a predetermined process has been performed appropriately, a screen showing functions and settings when the user performs a function setting operation, and the like.

The input key 16b is a power button. A power of the printer 1 is turned on when the printer 1 is in a power-off state, while the power of the printer 1 is turned off when the printer 1 is in a power-on state.

The input key 16c functions as a cursor key and a menu set key for selecting functions and settings of the printer 1 from among options displayed in the LCD 16a. The user can move a cursor displayed in the LCD 16a by pushing one of upper, lower, left, and right end portions of the input key 16c. The user also can select the function or setting by pushing a center portion of the input key 16c when the cursor is positioned at a desired function or setting in a screen displayed in the LCD 16a.

Items set by the input key 16c may include selection of whether to display a preview image for which the Retinex process has been performed, and selection of whether to perform the histogram process after performing the Retinex process.

The input key 16d includes numeric keys ("ten key") for inputting a number of sheets when printing and the like. The input key 16e includes two setting keys for selecting, after displaying a preview image, either performing the Retinex process of the original image to print a processed image or canceling printing.

<Histogram Process>

Figure 3A:
FIG. 3A shows an example image used to illustrate a histogram process of the embodiment.
Figure 3B:
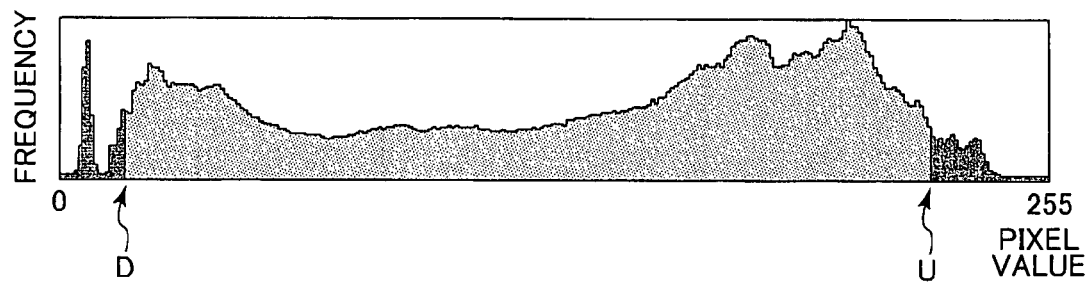
FIG. 3B is a histogram indicating frequencies of pixel values of the image shown in FIG. 3A.

A histogram process will be described with reference to FIGS. 3A and 3B. The histogram process will be used in an output process described later with reference to FIG. 5. FIG. 3A shows an example original image. FIG. 3B is a histogram formed from the original image shown in FIG. 3A. This histogram tabulates the number of pixels in the image having RGB values that indicate each integer 0-255, i.e. the frequency at which RGB values indicate each integer. In the case of color images, i.e. when each RGB value is represented by 8 bits, or a value from 0 to 255, each integer from 0 to 255 is tabulated by adding one for each pixel having an RGB value that matches the integer. For example, if the RGB values for a certain pixel are (100, 200, 200), then a "1" is added to the tabulation for the value 100 and a "2" is added to the tabulation for the value 200. The results of this tabulation are stored in the histogram memory 13c.

As shown in FIG. 3B, ratios for removing a light region and a dark region (cut ratios) are set for the histogram created above, and an upper limit U and a lower limit D are found from these ratios. For example, if each of the ratios for removing the light region and dark region is set to 3%, the upper limit U is set so that the number of pixels included in the light region from the maximum value 255 to the upper limit U corresponds to 3% of three times the total number of pixels (assuming the three values RGB for each pixel). Similarly, the lower limit D is set so that the number of pixels included in the dark region from the minimum value 0 to the lower limit D corresponds to 3% of three times the total number of pixels.

When setting the upper limit U and lower limit D in this way, values in the range from a minimum pixel value (0) to the lower limit D are set to the minimum pixel value, and values in the range from the upper limit U to a maximum pixel value (255) are set to the maximum pixel value. Values in the range from the lower limit D to the upper limit U are corrected with a linear or nonlinear function.

Specifically, if input is the inputted pixel value P, output is the corrected pixel value, the pixel value P falls within a range from 0 to 255, and γ2 is a constant (γ2=1 in this embodiment), then output is set as follows:
(i) Output=0, when input is less than or equal to the lower limit D;
(ii) Output=255, when input is greater than or equal to the upper limit U; and
(iii) a value calculated from equation 1, when input is greater than the lower limit D and less than the upper limit U.

$$\text{Output} = a^{\gamma 2} \times 255 \quad \text{(Equation 1)}$$

In equation 1, a=(input−D)/(U−D). When γ2=1, output expands linearly between the lower limit D and upper limit U.

Figure 4:
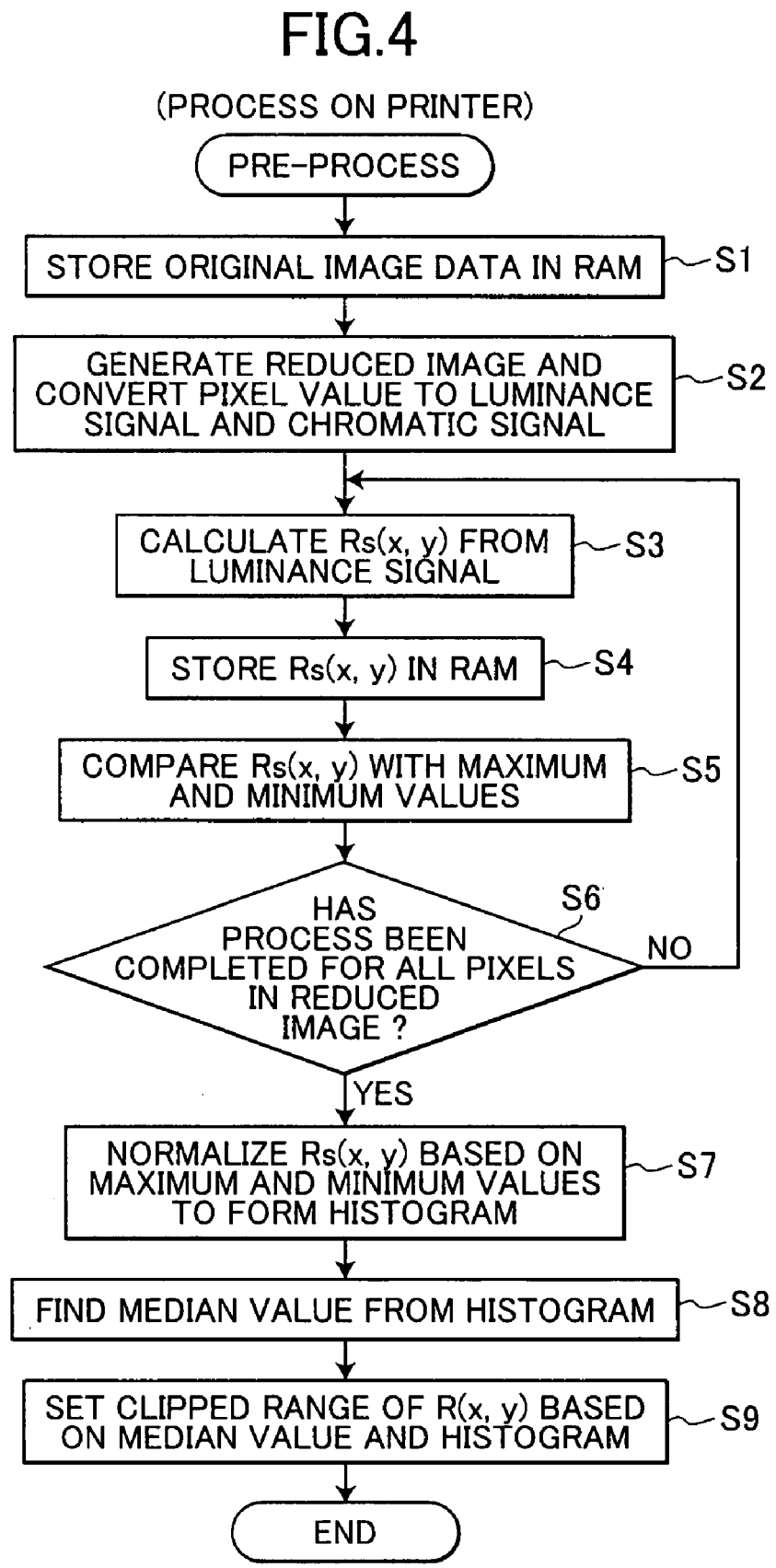
FIG. 4 is a flowchart illustrating steps in a pre-process of an image processing program executed on the printer according to the embodiment.
Figure 5:
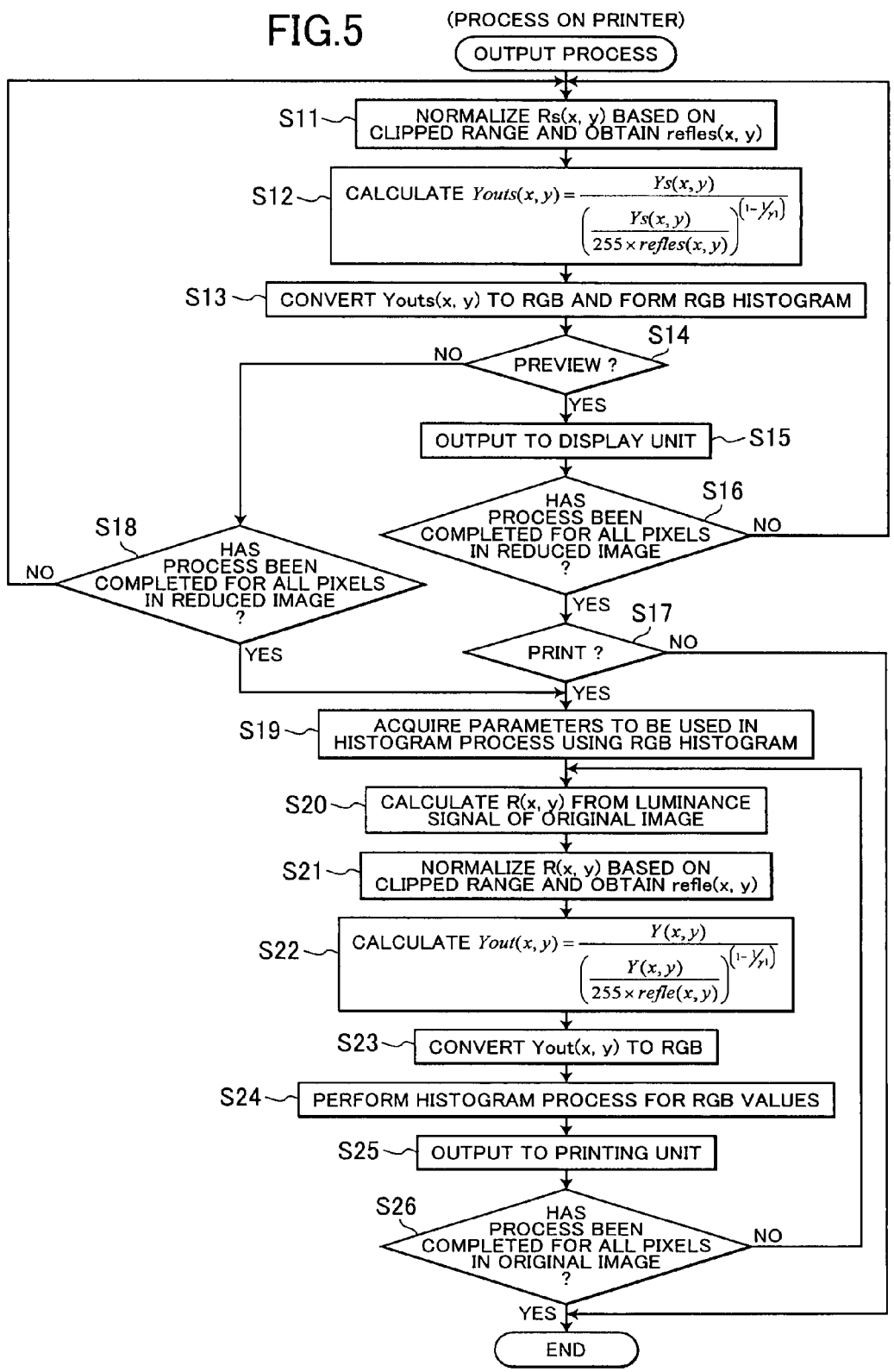
FIG. 5 is a flowchart illustrating steps in an output process executed after the pre-process of the image processing program according to the embodiment.

Next, an image process executed by the CPU 11 of the printer 1 according to the image processing program will be described with reference to FIGS. 4 and 5. The image processing program is stored in the image processing program memory 12a. In the embodiment, the CPU 11 performs a histogram process after performing a Retinex process. FIGS. 4 and 5 are flowcharts illustrating steps in this image process. The process shown in FIG. 4 will be referred to as a pre-process. In the pre-process, the CPU 11 sets a clipped range for normalizing reflectance of a reduced image (S11 in FIG. 5) and reflectance of an original image (S21 in FIG. 5). The image is not outputted to the printing unit 15 while the pre-process is executed.

In S1 of the pre-process shown in FIG. 4, the CPU 11 reads original image data from the PC 2 or digital camera 21 and stores this data in the original image data memory 13a of the RAM 13. In S2 the CPU 11 generates a reduced image by compressing the original image and converts RGB values for each pixel in the reduced image to a luminance value (luminance signal or intensity) Y and chromatic values (chromatic signals) Cb and Cr.

The nearest neighbor method or average pixel method is used for generating the reduced image, and the following equation is used to calculate the luminance value Y and the chromatic values Cb and Cr.

$$\begin{pmatrix} Y \\ Cb \\ Cr \end{pmatrix} = \begin{pmatrix} 0.30 & 0.59 & 0.11 \\ -0.17 & -0.34 & 0.51 \\ 0.51 & -0.43 & -0.08 \end{pmatrix} \begin{pmatrix} R \\ G \\ B \end{pmatrix} \quad \text{[Equation 2]}$$

In S3 the CPU 11 calculates a reflectance Rs(x, y) from the luminance value Y calculated above for each pixel in the reduced image. Here, the "s" is added to the end of symbols for indicating the reduced image as opposed to the original image. The reflectance Rs(x, y) is calculated according to the following equation.

$$Rs(x, y) = \log \frac{Ys(x, y)}{Fs(x, y) * Ys(x, y)} \quad \text{[Equation 3]}$$

In equation 3, x is the horizontal coordinate, y is the vertical coordinate, Ys(x, y) is the luminance value of the pixel at the coordinate (x, y), "*" is the convolution operator. Further, log is the natural logarithm to the base e. Fs(x, y) represents a Gaussian filter factor (filter coefficient) at the subject pixel (x, y) as shown in the following equation:

$$Fs(x,y) = \exp(-(x^2+y^2)/(c/75)^2) \quad \text{(Equation 4)}$$

where c is a coefficient determined dependently on the number of the peripheral (surround) pixels. So, the value Fs(x, y)*Ys(x, y) indicates the average value of the luminance values of the peripheral pixels (peripheral average luminance or surround average luminance).

In S4 the CPU 11 stores the reflectance Rs(x, y) found in the above calculations in the reflectance memory 13b of the RAM 13.

In S5 the CPU 11 compares the reflectance Rs(x, y) obtained in S4 with maximum and minimum values of reflectance Rs(x, y) values obtained thus far. Specifically, both of the maximum and minimum values are temporarily set to the reflectance Rs(x, y) found for the first-calculated pixel. All reflectance Rs(x, y) values subsequently obtained are compared with the current maximum and minimum values. If the current reflectance Rs(x, y) is greater than the maximum value, then this reflectance Rs(x, y) is set as the new maximum value. Similarly, if the current reflectance Rs(x, y) is less than the minimum value, then this reflectance Rs(x, y) is set as the new minimum value. When the current reflectance Rs(x, y) is less than or equal to the maximum value and is greater than or equal to the minimum value, the maximum and minimum values remain unchanged.

In S6 the CPU 11 determines whether the process in S3-S5 has been completed for all coordinates in the reduced image. If unprocessed coordinates remain (S6: NO), the CPU 11 returns to S3. However, if the process has been completed for all coordinates (S6: YES), then in S7 the CPU 11 normalizes the reflectance Rs(x, y) values based on the maximum and minimum values obtained in S5 to form a histogram. Normalization is achieved by setting the minimum reflectance Rs(x, y) among all coordinates to 0 and the maximum value to 255 and linearly setting all reflectance Rs(x, y) values for other coordinates to integers between 0 and 255. The histogram is formed in the histogram memory 13c by tabulating the frequency of pixels indicating each computed value between the maximum and minimum values. An example of the histogram is shown in FIG. 6.

In S8 the CPU 11 finds a median value Ms from the histogram formed in S7. In S9 the CPU 11 sets a clipped range of reflectance Rs(x, y) values (normalizing parameters) based on the median value Ms and the histogram. As an example, the clipped range has an upper limit Us including 45% of all samplings greater than the median value Ms, and a lower limit Ds including 45% of all samplings smaller than the median value Ms. The reflectance Rs(x, y) values corresponding to the upper limit Us and lower limit Ds are called UpR and DownR values, respectively. In this way, a clipped range (UpR, DownR) is obtained.

In the pre-process described above, the CPU 11 forms a Retinex image configured by the reflectance of the reduced image obtained by compressing the original image and finds the clipped range (normalizing parameters) for normalizing the reflectance of the original image. Since the clipped range is found based on the reflectance of the reduced image, it is possible to drastically reduce the number of operations for finding the clipped range from the number of operations required to find the clipped range from the original image, thereby increasing the processing speed. Further, a less storage space is required for storing Retinex image (reflectance) of the reduced image than for storing Retinex image of the original image.

Further, there is no great difference between the clipped range found using reflectance values of the reduced image and a clipped range found using reflectance values of the original image. The following table shows the differences between the clipped range (upper limit and lower limit) found based on the reflectance of the reduced image and the clipped range found based on the reflectance of the original image.

TABLE 1

|  | Clipped range | | Maximum/Minimum values | |
| --- | --- | --- | --- | --- |
|  | Upper limit | Lower limit | Maximum value | Minimum value |
| Original image | 0.825 | −0.822 | 2.712 | −4.063 |
| Reduced image | 0.742 | −0.755 | 1.729 | −2.607 |
| Difference | 0.083 | 0.067 | 0.983 | 1.456 |

As shown in Table 1, the maximum value of normalized reflectance values for the original image is 2.712, and the minimum value 4.063, while the maximum value of normalized reflectance values for the reduced image is 1.729, and the minimum value 2.607. Hence, the difference between the maximum normalized reflectance for the original image and the maximum normalized reflectance for the reduced image is 0.983, and the difference between the minimum normalized reflectance for the original image and the minimum normalized reflectance for the reduced image is 1.456. These differences are considerably large.

However, the upper limit of the clipped range found based on the reflectance values of the original image is 0.825 and the lower limit −0.822, while the upper limit found based on the reflectance values of the reduced image is 0.742 and the lower limit −0.755. Hence, the difference between the upper limit of normalized reflectance values for the original image and the upper limit of normalized reflectance values for the reduced image is 0.083, while the difference between the lower limit of normalized reflectance values for the original image and the lower limit of normalized reflectance values for the reduced image is 0.067. These differences are small.

Next, an output process will be described with reference to the flowchart in FIG. 5. In the output process, the CPU 11 generates and displays a preview image based on the clipped range obtained by the pre-process shown in FIG. 4, and prints (outputs) the processed image after the preview image has been checked by the user.

In S11 the CPU 11 normalizes the reflectance Rs(x, y) values (reduced Retinex image) stored in the reflectance memory 13b within the clipped range (UpR, DownR) found in the pre-process of FIG. 4, in order to find normalized reflectance (normalized Retinex value) refles(x, y).

The normalized reflectance refles(x, y) is set to 0.0 when the value of reflectance Rs(x, y) is less than or equal to DownR, set to 1.0 when the value of reflectance Rs(x, y) is greater than or equal to UpR, and calculated from equation 5 shown below when the value of reflectance Rs(x, y) is greater than DownR and less than UpR.

$$refles(x, y) = \frac{Rs(x, y) - DownR}{UpR - DownR} \quad \text{[Equation 5]}$$

Through this process, refles(x, y) is normalized to a value between 0.0 and 1.0. Through experimentation, it has been found preferable to add 0.3 to this value to obtain a value between 0.3 and 1.3 for refles(x, y).

In S12 the CPU 11 finds an output luminance value Youts(x, y) according to equation 6 shown below. In other words, the CPU 11 performs the Retinex process on the luminance value for each pixel in the reduced image in equation 6, γ1 is a gamma constant.

$$Youts(x, y) = \frac{Ys(x, y)}{\left(\frac{Ys(x, y)}{255 \times refles(x, y)}\right)^{(1 - 1/\gamma 1)}} \quad \text{[Equation 6]}$$

In S13 the CPU 11 converts Youts(x, y) to RGB values based on equation 7 shown below Youts in equation 7 corresponds to Youts(x, y) in equation 6. Cr and Cb in equation 7 correspond to Cr and Cb in equation 2. Note that a coordinate (x, y) is omitted in equation 7 for simplification.

$$\begin{pmatrix} R \\ G \\ B \end{pmatrix} = \begin{pmatrix} 1.00 & 0 & 1.37 \\ 1.00 & -0.34 & -0.70 \\ 1.00 & 1.73 & 0 \end{pmatrix} \begin{pmatrix} Youts \\ Cb \\ Cr \end{pmatrix} \quad \text{[Equation 7]}$$

Then, the CPU 11 forms a histogram for the RGB values. Forming the histogram involves adding "1" to frequencies of integers between 0 and 255 for each corresponding R value, G value, and B value obtained by equation 7. The incremented values are stored in the histogram memory 13c.

In S14 the CPU 11 determines whether the printer 1 is set such that a preview image is displayed in the LCD 16a. If the printer 1 is sot to display the preview image (S14: YES), then in S15 the CPU 11 outputs the RGB values found from equation 7 to the LCD 16a (display unit). Accordingly, a Retinex-processed preview image is displayed on the LCD 16a.

In S16 the CPU 11 determines whether the process has been completed for all the pixels in the reduced image. If there are still unprocessed pixels (S16: NO), then the CPU 11 returns to S11. If the process has been completed for all the pixels (S16: YES), then in S17 the CPU 11 determines whether the user has selected to perform printing.

If the user has selected not to perform printing (S17: NO), then the CPU 11 ends the output process without performing printing. If the user has selected to perform printing (S17: YES), then in S19 the CPU 11 acquires parameters to be used in the histogram process. These parameters include the constant γ2, the upper limit U, and the lower limit D. The constant γ2 is set to 1 by default in the embodiment. The upper limit U and the lower limit D are obtained from the histogram formed in S13, because the cut ratios for removing the light region and dark region from the histogram are set to 3% by default.

On the other hand, if the printer 1 is set not to display the preview image (S14: NO), then in S18 the CPU 11 determines whether the process has been completed for all the pixels in the reduced Retinex image. If there are still unprocessed pixels (S18: NO), then the CPU 11 returns to S11. If the process has been completed for all the pixels (S18: YES), then the CPU 11 proceeds to S19.

The above-described process sets both the clipped range for normalizing the Retinex image (reflectance) and the parameters to be used in the histogram process which is executed after the Retinex process. After these clipped range and parameters are set, the CPU 11 performs the Retinex process and the histogram process for each pixel in the original image sequentially and outputs processed values to the printing unit 15.

Specifically, in S20 the CPU 11 finds luminance values Y and chromatic values Cr and Cb for pixels in the original image according to the above-described equation 2, and calculates reflectance Re(x, y) from the luminance values according to the following equation.

$$R(x, y) = \log \frac{Y(x, y)}{F(x, y) * Y(x, y)} \quad \text{[Equation 8]}$$

In S21 the CPU 11 finds normalized reflectance refle(x, y) by normalizing reflectance R(x, y) based on the clipped range (UpR, DownR) found in S9, according to the following equation.

$$refle(x, y) = \frac{R(x, y) - DownR}{UpR - DownR} \quad \text{[Equation 9]}$$

In S22 the CPU 11 calculates Yout(x, y) according to the following equation.

$$Yout(x, y) = \frac{Y(x, y)}{\left(\frac{Y(x, y)}{255 \times refle(x, y)}\right)^{(1-1/\gamma 1)}} \quad \text{[Equation 10]}$$

In S23 the CPU 11 converts Yout(x y) to RGB values based on equation 11 shown below. Yout in equation 11 corresponds to Yout(x, y) in equation 10. Cr and Cb in equation 11 correspond to Cr and Cb found in S20. Note that a coordinate (x,y) is omitted in equation 11 for simplification.

$$\begin{pmatrix} R \\ G \\ B \end{pmatrix} = \begin{pmatrix} 1.00 & 0 & 1.37 \\ 1.00 & -0.34 & -0.70 \\ 1.00 & 1.73 & 0 \end{pmatrix} \begin{pmatrix} Yout \\ Cb \\ Cr \end{pmatrix} \quad \text{[Equation 11]}$$

In S24 the CPU 11 performs the histogram process for the RGB values based on the parameters obtained in S19. In S25 the CPU 11 outputs processed ROB values to the printing unit 15.

In S26 the CPU 11 determines whether the process has been completed for all the pixels in the original image. If there are still unprocessed pixels (S26: NO), then the CPU 11 returns to S20. If the process has been completed for all the pixels (S26: YES), then the output process of FIG. 5 ends.

According to the above-described embodiment, the CPU 11 in the printer 1 sets the clipped range (normalizing parameters) used for normalizing the reflectance and the parameters used for the histogram process, based on a reduced image obtained by reducing an original image. Accordingly, the process can be performed at a high speed. Hence, the printer 1 can shorten a time period since the start of the Retinex process until the start of outputting a processed image.

Further, the printer 1 uses a reduced Retinex image (Retinex-processed reflectance of a reduced image) for displaying the reduced image as a preview image. Hence, the user can visually check the preview image prior to printing in order to confirm how the image is calibrated (corrected). In addition, the printer 1 can form the preview image at a high speed. The size of program for executing the process can be made small.

When the Retinex process is performed on an original image after a preview image is displayed, a time period before the start of outputting an image can be shortened since upper and lower limits for performing normalization are already set.

In the embodiment, the reflectance Rs(x, y) is calculated according to equation 3 which includes convolution calculations. Since the reflectance is calculated for a reduced image, a number of times to perform convolution calculations can be made fewer, thereby enabling high-speed processing.

In the embodiment, luminance values are obtained from a reduced image and the Retinex process is performed on the luminance values. Accordingly, compared with a case where the Retinex process is performed on each of RGB components, the process can be performed at a higher speed and color shifts can be prevented from occurring.

In the embodiment, the printer 1 sets, as the normalizing parameters, the lower and upper limits of the clipped range including a predetermined ratio of all the pixels having pixel values between the minimum and maximum values. As described above, the lower and upper limits set in this way approximately equal to the lower and upper limits set using the original image. Accordingly, the lower and upper limits can be set quickly while maintaining accuracy of the limits. In contrast, if the maximum and minimum values are used as the normalizing parameters instead of the upper and lower limits, the maximum and minimum values obtained for the reduced image may be substantially different from the maximum and minimum values obtained for the original image.

While the invention has been described in detail with reference to the above aspects thereof, it would be apparent to those skilled in the art that various changes and modifications may be made therein without departing from the spirit of the invention.

In the above-described embodiment, the lower limit D used in the histogram process is set so that the number of pixels included in the dark region corresponds to 3% of three times the total number of pixels. However, the lower limit D may be set according to the value of γ1 in equation 10 of the Retinex process. The image is corrected to be brighter when the value of γ1 is larger and corrected less when the value of γ1 is smaller. Hence, when γ1 is large, the value of the lower limit D is increased (the cut ratio or amount of the dark region that is cut is increased). In this way, the bright region of a resultant image can be emphasized by shifting the pixel values to the darker side as a whole through the histogram process.

In the above-described embodiment, the value of γ2 used in the histogram process is set to 1 by default. However, the value of γ2 may be set as follows. The Retinex process corrects backlit portions and the like, but also corrects the overall image to be brighter, giving a different impression from the original image. By applying gamma correction in the histogram process opposite the gamma correction used for adjusting the luminance in the Retinex process, it is possible to restore regions that are too bright to a natural state. Hence, the value of γ2 may be obtained according to the following equation based on a constant γ1 used for gamma correction in the Retinex process (equation 10). Specifically, γ2 can be found from equation:

$$\gamma 2 = (\gamma 1 - 1.0)/A + 1.0 \quad \text{[Equation 12]}$$

where A is a value between 5 and 20.

Alternatively, the value of γ2 may be set so that the median value after the Retinex process approaches the median value prior to the Retinex process. If input is the pixel value, output is the corrected pixel value, B is the overall range of pixel values, MAX is the maximum value of the overall range, MIN is the minimum value of the overall range, D is an upper limit of a lower range, U is a lower limit of an upper ranger OM is the median value of the original image, RM is the median value of the image processed in the Retinex process described above, and α is a constant, output is set as follows:

output=MIN, when input is in the lower range (less than D);

output=MAX, when input is in the upper range (greater than U); and output=a value derived from equation 13 when input is between D and U, $$\text{Output} = a^{\gamma 2} \times B \qquad \text{[Equation 13]}$$

where a=(input−D)/(U−D),

γ2=log(target/MAX)/log(RM/MAX), and target=(OM×α+RM)/(1+α).

When the constant α is set to 1, target is set between the median value prior to the Retinex process and the median value after the Retinex process. The value of target is set to approach the median value of the original image when the constant α is greater than 1, and to separate from the median value of the original image when the constant α is less than 1. The constant α may be set to a predetermined value or may be arbitrarily set by the user.

In the above-described embodiment, the RGB color system is used, but a color system other than the RGB color system may be used. For example, the invention may be applied to the CMY color model or the like.

In the above-described embodiment, the CPU 11 provided in the printer 1 executes the image processing program. However, this program may be provided to a personal computer as an application program that is executed by a CPU or the like provided in the personal computer. Further, the program may be executed by a multifunction peripheral having a plurality of functions including printer, scanner, copier, facsimile, and the like.

In the above-described embodiment, the printer 1 displays a preview image obtained by performing the Retinex process on a reduced image. However, the preview image may be obtained by performing the Retinex process on the reduced image and then performing the histogram process. In this case, a step for performing the histogram process for RGB values in the reduced image (a step similar to S24) is added between steps S13 and S14 in FIG. 5. In this way, the user can check effects of both the Retinex process and the histogram process in advance, and can perform printing only when the user accepts the effects of the processes. In other words, the user can check the effects of the histogram process which corrects an image where the dynamic range is small or where the overall image is excessively light, and can perform the histogram process on the original image only when the user accepts the effects of the histogram process.

Either the single-scale Retinex (SSR) or multi-scale Retinex (MSR) method may be used in the Retinex process.

In the above-described embodiment, the CPU 11 in the printer 1 performs the Retinex process and the like. However, these processes may be performed with a digital signal processor (DSP). The DSP can be used to execute product-sum operations and other operations more quickly.

In the above-described embodiment, the peripheral average luminance is defined as the value F(x, y)*Y(x, y) (equations 3 and 8) which is convolution between a filter coefficient F(x, y) and luminance value Y(x, y). However, an optically unfocused blurred image described in Japanese Patent No. 3731577 may be used as the peripheral average luminance. Alternatively, an image obtained by photographing the same object in a lower resolution may also be used as the peripheral average luminance.

In the above-described embodiment, a luminance value Y is calculated from pixel values (RGB) of a color image, then a Retinex process is performed on the luminance value Y. However, the Retinex process may be performed on each of RGB values.

What is claimed is:

1. An image processing device comprising:
a display unit that displays an image;
a reduced-image creating portion that creates a reduced image from an original image;
a reduced-retinex-image forming portion that calculates reflectance of each pixel in the reduced image based both on a pixel value of a subject pixel in the reduced image and on a peripheral average luminance of the subject pixel, thereby forming a reduced retinex image that is configured of reflectance of each pixel in the reduced image;
a normalizing-parameter setting portion that obtains frequencies of the reflectance in the reduced retinex image and that sets an upper limit and a lower limit for normalization;
a reduced-image correcting portion comprising:
a first normalizing portion that normalizes the reflectance of the reduced image based on the upper limit and the lower limits thereby obtaining a normalized reflectance for each pixel in the reduced image; and
a first correcting portion that corrects the reduced image based both on the normalized reflectance and on the pixel value for each pixel in the reduced image, thereby obtaining a corrected reduced image;
a preview-image displaying portion that displays the corrected reduced image on the display unit; and
an original-image correcting portion comprising:
a retinex-image forming portion that calculates reflectance of each pixel in the original image based both on a pixel value of a subject pixel in the original image and on a peripheral average luminance of the subject pixel;
a second normalizing portion that normalizes the reflectance of the original image based on the upper limit and the lower limit, thereby obtaining a normalized reflectance for each pixel in the original image, and
a second correcting portion that corrects the original image based both on the normalized reflectance and on the pixel value for each pixel in the original image, thereby obtaining a corrected original image.

2. The image processing device according to claim 1, wherein the reduced-image creating portion comprises a sampling portion that samples pixels from the original image by a nearest neighbor method, thereby creating the reduced image; and
wherein the reduced-retinex-image forming portion comprises a calculating portion that calculates convolution between filter coefficients and pixel values of the pixels sampled by the sampling portion.

3. The image processing device according to claim 1, wherein the reduced-image creating portion comprises an image reducing portion that reduces the original image by an average pixel method; and
wherein the reduced-retinex-image forming portion comprises a calculating portion that calculates convolution between filter coefficients and pixel values of pixels in the reduced image.

4. The image processing device according to claim 1, wherein the reduced-retinex-image forming portion forms the reduced retinex image based on a luminance signal obtained for each pixel in the reduced image;
wherein the retinex-image forming portion calculates the reflectance of each pixel in the original image based both on the luminance signal of the subject pixel in the original image and on the peripheral average luminance of the subject pixel; and wherein the second correcting portion corrects the original image based both on the normalized reflectance and on the luminance signal for each pixel in the original image.

5. The image processing device according to claim 1, further comprising:
a histogram creating portion that obtains frequencies of pixel values in the corrected reduced image obtained by the first correcting portion, thereby creating a histogram;
a histogram-process parameter setting portion that sets a parameter used for a histogram process based on the histogram created by the histogram creating portion; and
a reduced-image histogram process performing portion that performs a histogram process on the reduced image based on the parameter set by the histogram-process parameter setting portion,
wherein the preview-image displaying portion displays on the display unit the reduced image processed by the reduced-image histogram process performing portion.

6. The image processing device according to claim 1, wherein the normalizing-parameter setting portion sets the upper limit and the lower limit based on a clipped range, the clipped range including pixels of a predetermined ratio of all pixels in the reduced image.

7. The image processing device according to claim 1, further comprising:
a histogram creating portion that obtains frequencies of pixel values in the corrected reduced image obtained by the first correcting portion;
a histogram-process parameter setting portion that sets a parameter used for a histogram process based on the histogram created by the histogram creating portion; and
an original-image histogram process performing portion that performs a histogram process on the original image based on the parameter set by the histogram-process parameter setting portion.

8. The image processing device according to claim 7, wherein the histogram process includes correcting pixel values by changing a range that the pixel values take.

9. A storage medium storing a set of program instructions executable on an image processing device, the set of program instructions comprising:
creating a reduced image from an original image;
calculating reflectance of each pixel in the reduced image based both on a pixel value of a subject pixel in the reduced image and on a peripheral average luminance of the subject pixel, thereby forming a reduced retinex image that is configured of reflectance of each pixel in the reduced image;
obtaining frequencies of the reflectance in the reduced retinex image and setting an upper limit and a lower limit for normalization;
normalizing the reflectance of the reduced image based on the upper limit and the lower limit, thereby obtaining a normalized reflectance for each pixel in the reduced image;
correcting the reduced image based both on the normalized reflectance and on the pixel value for each pixel in the reduced image, thereby obtaining a corrected reduced image;
displaying the corrected reduced image on a display unit;
calculating reflectance of each pixel in the original image based both on a pixel value of a subject pixel in the original image and on a peripheral average luminance of the subject pixel;
normalizing the reflectance of the original image based on the upper limit and the lower limit, thereby obtaining a normalized reflectance for each pixel in the original image; and
correcting the original image based both on the normalized reflectance and on the pixel value for each pixel in the original image, thereby obtaining a corrected original image.

10. The storage medium according to claim 9, wherein the instructions for creating a reduced image comprise sampling pixels from the original image by a nearest neighbor method, thereby creating the reduced image; and
wherein the instructions for calculating reflectance of each pixel in the reduced image comprise calculating convolution between filter coefficients and pixel values of the pixels sampled by the sampling instructions.

11. The storage medium according to claim 9, wherein the instructions for creating a reduced image comprise reducing the original image by an average pixel method; and
wherein the instructions for calculating reflectance of each pixel in the reduced image comprise calculating convolution between filter coefficients and pixel values of pixels in the reduced image.

12. The storage medium according to claim 9, wherein the instructions for calculating reflectance of each pixel in the reduced image comprise forming the reduced retinex image based on a luminance signal obtained for each pixel in the reduced image;
wherein the instructions for calculating reflectance of each pixel in the original image comprise calculating the reflectance of each pixel in the original image based both on the luminance signal of the subject pixel in the original image and on the peripheral average luminance of the subject pixel; and
wherein the instructions for correcting the original image comprise correcting the original image based both on the normalized reflectance and on the luminance signal for each pixel in the original image.

13. The storage medium according to claim 9, wherein the set of program instructions further comprises:
obtaining frequencies of pixel values in the corrected reduced image, thereby creating a histogram;
setting a parameter used for a histogram process based on the histogram created by the instructions for obtaining frequencies; and
performing a histogram process on the reduced image based on the parameter set by the instructions for setting a parameter; and
wherein the displaying instructions comprise displaying on a display unit the reduced image processed by the instructions for performing a histogram process on the reduced image.

14. The storage medium according to claim 9, wherein the instructions for setting an upper limit and a lower limit for normalization comprise setting the upper limit and the lower limit based on a clipped range, the clipped range including pixels of a predetermined ratio of all pixels in the reduced image.

15. The storage medium according to claim 9, wherein the set of program instructions further comprises
obtaining frequencies of pixel values in the corrected reduced image, thereby creating a histogram;
setting a parameter used for a histogram process based on the histogram created by the instructions for obtaining frequencies; and performing a histogram process on the original image based on the parameter set by the instructions for setting a parameter.

16. The storage medium according to claim 15, wherein the histogram process includes correcting pixel values by changing a range that the pixel values take.

17. An image processing method comprising:

creating a reduced image from an original image;

calculating reflectance of each pixel in the reduced image based both on a pixel value of a subject pixel in the reduced image and on a peripheral average luminance of the subject pixel, thereby forming a reduced retinex image that is configured of reflectance of each pixel in the reduced image;

obtaining frequencies of the reflectance in the reduced retinex image and setting an upper limit and a lower limit for normalization;

normalizing the reflectance of the reduced image based on the upper limit and the lower limit, thereby obtaining a normalized reflectance for each pixel in the reduced image;

correcting the reduced image based both on the normalized reflectance and on the pixel value for each pixel in the reduced image, thereby obtaining a corrected reduced image;

displaying the corrected reduced image on a display unit;

calculating reflectance of each pixel in the original image based both on a pixel value of a subject pixel in the original image and on a peripheral average luminance of the subject pixel;

normalizing the reflectance of the original image based on the upper limit and the lower limits thereby obtaining a normalized reflectance for each pixel in the original image; and correcting the original image based both on the normalized reflectance and on the pixel value for each pixel in the original image, thereby obtaining a corrected original image.

* * * * *